(12) United States Patent
Tang et al.

(10) Patent No.: US 9,902,515 B2
(45) Date of Patent: *Feb. 27, 2018

(54) SINGLE-CYLINDER SINGLE-CLAW DOUBLE-CARD PUNCHING MACHINE

(75) Inventors: Qiuming Tang, Shijiazhuang (CN); Shujun Ren, Shijiazhuang (CN); Dan Wang, Shijiazhuang (CN); Chunbing Lv, Shijiazhuang (CN)

(73) Assignee: Shanghai Sunson Activated Carbon Technology Co., Ltd., Shanghai (CN)

( * ) Notice: Subject to any disclaimer, the term of this patent is extended or adjusted under 35 U.S.C. 154(b) by 355 days.

This patent is subject to a terminal disclaimer.

(21) Appl. No.: 14/372,613

(22) PCT Filed: Apr. 28, 2012

(86) PCT No.: PCT/CN2012/000570
§ 371 (c)(1),
(2), (4) Date: Jul. 16, 2014

(87) PCT Pub. No.: WO2013/106971
PCT Pub. Date: Jul. 25, 2013

(65) Prior Publication Data
US 2014/0359987 A1  Dec. 11, 2014

(30) Foreign Application Priority Data
Jan. 16, 2012  (CN) .......................... 2012 1 0013258

(51) Int. Cl.
*B25B 3/00* (2006.01)
*B65B 51/05* (2006.01)
*A22C 11/12* (2006.01)

(52) U.S. Cl.
CPC ............ *B65B 51/05* (2013.01); *A22C 11/125* (2013.01); *Y10T 29/53783* (2015.01)

(58) Field of Classification Search
CPC ................ B25B 1/00; B25B 3/00; B25B 7/00
(Continued)

(56) References Cited

U.S. PATENT DOCUMENTS

| 293,918 A | * | 2/1884 | Sprout | B25B 31/00 140/25 |
| 2,176,133 A | * | 10/1939 | Hogg | B65B 51/05 53/347 |

(Continued)

OTHER PUBLICATIONS

Jun. 2, 2015 Office Action issued in Australian Application No. 2012366094.

*Primary Examiner* — Lee D Wilson
(74) *Attorney, Agent, or Firm* — Oliff PLC

(57) ABSTRACT

A single-cylinder single-claw double-card punching machine, including an air cylinder; the working end face of the air cylinder is connected to a connecting frame; a gantry moving frame is disposed in the middle of the lower part of the connecting frame in an interleaved manner; a piston rob of the air cylinder passes through the connecting frame to connect with the gantry moving frame; both sides of the connecting frame are provided with snap action moving device; a retaining clamp and a folding clamp are disposed at the bottom of the connecting frame; and a card-pushing sheet and a cutter are disposed under the gantry moving frame. The card punching speed of the single-cylinder single-claw double-card pneumatic punching machine is as high as 166 times per minute, with high efficiency and energy savings.

14 Claims, 12 Drawing Sheets

(58) Field of Classification Search
USPC .................................. 29/243.56; 269/24–29
See application file for complete search history.

(56) References Cited

U.S. PATENT DOCUMENTS

| | | | | |
|---|---|---|---|---|
| 2,722,001 A * | 11/1955 | Mott | ................. | B65B 51/05 227/108 |
| 2,899,679 A * | 8/1959 | Allen | ................. | B65B 51/05 227/108 |
| 3,005,988 A * | 10/1961 | Kirton | ................. | B65B 51/05 227/108 |
| 3,064,263 A * | 11/1962 | Powers | ................. | A01K 15/003 206/341 |
| 4,214,492 A * | 7/1980 | Hoffman | ................. | A22C 11/125 452/49 |
| 4,821,485 A * | 4/1989 | Evans | ................. | B65B 9/15 29/243.57 |
| 5,020,298 A * | 6/1991 | Evans | ................. | A22C 11/108 29/243.57 |
| 5,209,041 A * | 5/1993 | Evans | ................. | A22C 11/125 29/243.57 |
| 5,259,168 A * | 11/1993 | Evans | ................. | A22C 11/108 29/243.56 |
| 5,897,066 A * | 4/1999 | Bacon | ................. | B02C 18/146 241/160 |
| 6,604,338 B1 * | 8/2003 | May | ................. | A22C 11/125 53/138.2 |
| 7,143,566 B2 * | 12/2006 | May | ................. | B65B 9/15 53/138.4 |
| 7,854,103 B2 * | 12/2010 | Griggs | ................. | A22C 11/125 29/243.57 |
| 8,006,463 B2 * | 8/2011 | May | ................. | A22C 11/125 452/48 |
| 9,010,072 B2 * | 4/2015 | May | ................. | A22C 21/00 53/138.3 |
| D729,294 S * | 5/2015 | Lowder | ................. | D15/199 |
| D737,352 S * | 8/2015 | May | ................. | D15/145 |
| 9,242,752 B2 * | 1/2016 | Griggs | | |
| D760,827 S * | 7/2016 | May | ................. | D15/145 |
| 2002/0023577 A1 * | 2/2002 | Guerreschi | ................. | D05B 29/02 112/237 |
| 2015/0151865 A1 * | 6/2015 | Tang | ................. | B65B 51/04 53/138.2 |

* cited by examiner

SINGLE-CYLINDER SINGLE-CLAW DOUBLE-CARD PUNCHING MACHINE

TECHNICAL FIELD

The present invention relates to the technical field of emulsion explosive, cartridge and food sausage, and flexible packaging industry, particularly, relates to a single-cylinder single-claw double-card pneumatic punching machine.

BACKGROUND OF THE INVENTION

U.S. Pat. No. 3,783,583 discloses a card pneumatic punching machine which is driven by a plurality of cylinders to complete the card-punching. Currently, the card punching speed of the double-card pneumatic punching machine is usually 50 times per minute. The speed can be improved by electrically drive the machine. This kind of card-punching machine completes the card-punching by using a series of complicated mechanical components in turn including shaft, connecting rod, lever, cam, shift fork, slider, slide, swing axis and cutting cylinder, and the card punching speed may be up to 130 times per minute. But this kind of card-punching machine has a large spatial size as well as hundreds of kilograms in weight.

U.S. Pat. No. 4,821,485 discloses a single-claw pneumatic punching machine. The card-punching machine completes card-punching by using six cylinders in different sizes, including two card-pushing cylinders, one folding cylinder, one small card-punching cylinder worked together with one linked big card-punching cylinder, and one cutting cylinder. The card punching speed is about 40 times per minute. However, this kind of card-punching machine has a complex structure and a high energy consumption.

For the above deficiencies existed in the prior art, the present invention is provided.

SUMMARY OF THE INVENTION

The object of the present invention is to provide a single-cylinder single-claw double-card pneumatic punching machine.

In order to achieve the above-stated objects, the technical approach of the present invention which provides a single-cylinder double-card pneumatic punching machine is that: a single-cylinder single-claw double-card punching machine, comprising an air cylinder, said cylinder adapted to push a gantry moving frame to move down, meanwhile drive a snap action moving device, a card-pushing sheet and a cutter to move down, and tuck a retaining clamp and a folding clamp until the card punching is completed; when the gantry moving frame moves up, it drives the card-pushing sheet and cutter to move up, and releases the folding clamp, then a punching process is completed.

In a class of embodiment, a connecting frame is connected to the working end face of said air cylinder, and connecting plates are provided at both sides of the connecting frame, an n-type gantry moving frame is disposed in the middle under the connecting frame in an interleaved manner, a piston rob of the air cylinder passes through the connecting frame to connect with the n-type gantry moving frame; a retaining clamp and a folding clamp are provided at the bottom of the connecting frame.

In a class of embodiment, a card-pushing sheet and a cutter are disposed under said n-type gantry moving frame, pulleys are provided at both sides of the bottom of the n-type gantry moving frame, the pulleys respectively sliding in the slideways of the retaining clamp and the folding clamp.

In a class of embodiment, both sides of said connecting frame are provided with snap action moving device, and said snap action moving device is provided in a square crossing manner with said n-type gantry moving frame.

In a class of embodiment, said connecting frame comprises a basic plate, which is fixed at the working end of the cylinder by bolted connection, each of both sides at the lower surfaces of the basic plate is provided with an integrated connecting plate, the integrated connecting plate is in the shape of an inverted Y and provided with fixing legs with branches at the bottom of the connecting plate, fixing holes are provided on the fixing legs; a central hole for said piston rod to go through is disposed in the central section of said basic plate; rail holes are provided on the surfaces of connecting plates at both sides.

In a class of embodiment, a multi-purpose pin shaft is provided between the rail holes on said connecting plates at both sides, the multi-purpose pin shaft is adapted to move up and down in the rail holes, and the multi-purpose pin is located under the n-type gantry moving frame; a fixed block is provided on the multi-purpose pin, said card-pushing sheet and said cutter are assembled on the fixed block.

In a class of embodiment, said retaining clamp and said folding clamp are coordinated with each other in an embedded manner, and the retaining clamp is claw type, two pin shaft holes are provided on two top ends of the retaining clamp, the pin shaft holes are aligned with fixing holes in the connecting frame and fixed by pin shaft; a guide block is provided on one side of the retaining clamp, a chute is provided in the guide block, the chute accommodates the foot pulley on the vertical side of the n-type gantry moving frame, a snap molding is embedded in the corner of the retaining clamp.

In a class of embodiment, said guide block and the retaining clamp are disposed in a interleaved embedded manner, the guide block is against the retaining clamp.

In a class of embodiment, a guide roller is provided on one side of said chute, and a guide bearing is provided on the other side of said chute, the guide bearing is hitched to the pin shaft disposed on the fixing leg, and coordinates with the guide roller to guide the vertical side of the n-type gantry moving frame move up and down in the chute.

In a class of embodiment, a cutter guide slot is provided in the middle of said retaining clamp for accommodating and guiding the hook-type cutter, guide slots are respectively provided at both sides for accommodating and guiding card-pushing sheet.

In a class of embodiment, said folding clamp comprises a crab claw, both back sides of the crab claw reversely extend to form two lateral plates, pin shaft holes are provided at the ends of the lateral plates, the pin shaft holes are aligned with the fixing holes in the connecting frame of the other side and fixed by the pin shaft; the space between the two lateral plates forms a sildeway, the slideway accommodates another foot pulley on the n-type gantry moving frame.

In a class of embodiment, said snap action moving device comprises a U-shape guide rail which is formed by two L-shape guide rails respectively located on left and right side whose lower sides are butted with each other, the vertical side of the L-shape guide rail is fixed on one side of the basic plate of the connecting frame, and also fixed on the connecting plate which is on the lower surface of the connecting frame through a rail supporting frame, a snap guide device is provided on one end of the vertical side of the L-shape guide rail, a mounting plate is provided on the inner side of the L-shape guide rail, the rail supporting frame is fixed at the top of the mounting plate, a strip hole is provided in the central section of the mounting plate, a spring is provided in an upper inner part of the strip hole, a card-punching device is assembled on the strip hole of the mounting plate through a pin shaft and a bearing, and the card-punching device keeps compressing the spring by multi-purpose pin to deliver snap; the end of the horizontal side of the L-shape guide rail is fixed to the retaining clamp or folding clamp together by guide rail fixed block and mounting plate.

In a class of embodiment, a card-punching retaining device is provided under said card-punching device, and the card-punching retaining device is assembled at the card-punching guide rail and the mounting plate, the bottom of the card-punching retaining device and/or the card-punching device are provided with snap retaining block.

The advantage of the present invention is that: utilizing a single cylinder to complete card-punching of the U-shape double-card snap action integratedly, the card punching speed of the present invention is as high as 166 times per minute, with high efficiency and energy savings.

BRIEF DESCRIPTION OF THE DRAWINGS

The invention will be described in greater detail with references to the appended drawings in order to make the invention and the advantages understood better. However, the drawings described herein are intended to provide a further understanding of the present invention, constituting part of the invention. The embodiments and their descriptions of the present invention are for explaining the present invention, which do not constitute undue limitation of the present invention, wherein.

DETAILED DESCRIPTION OF THE EMBODIMENTS

Figure 1:
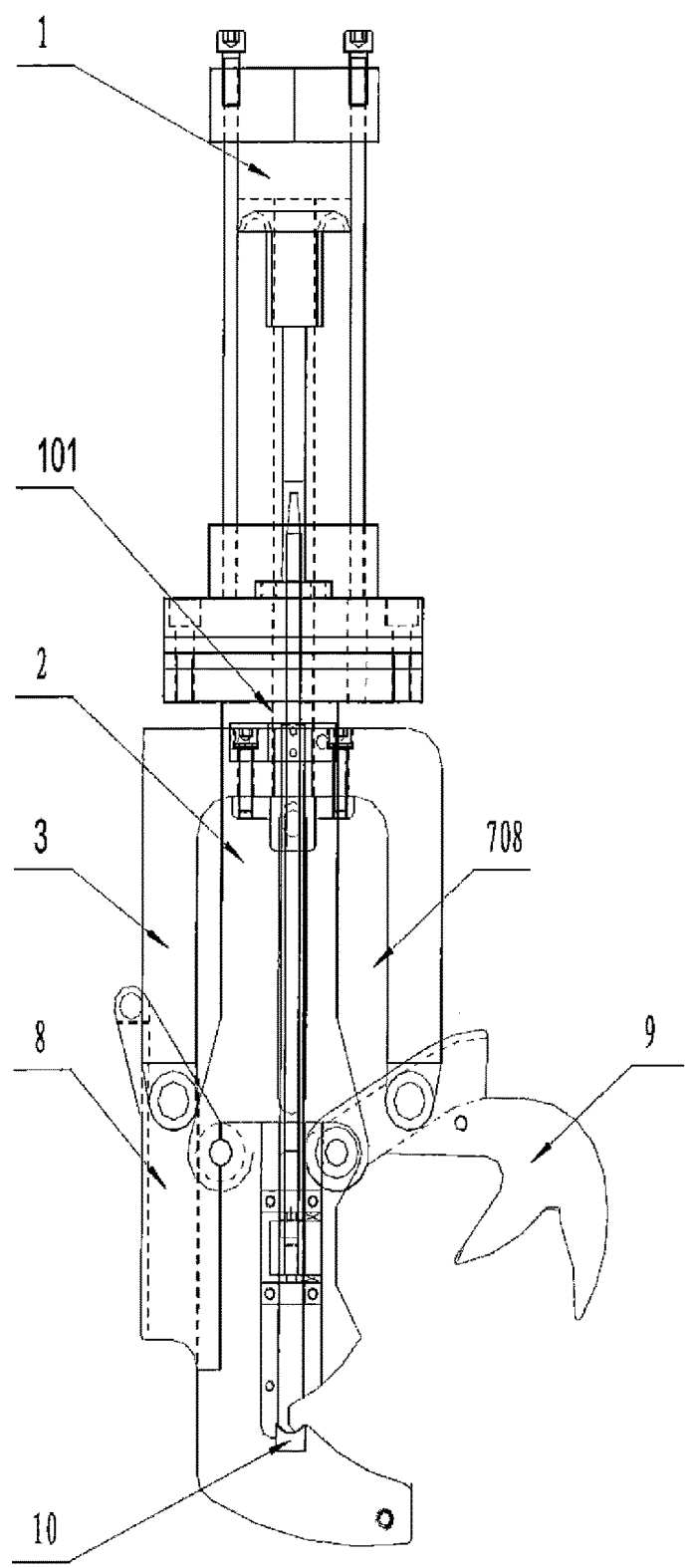
FIG. 1 is a general assembly view of the present invention.
Figure 2:
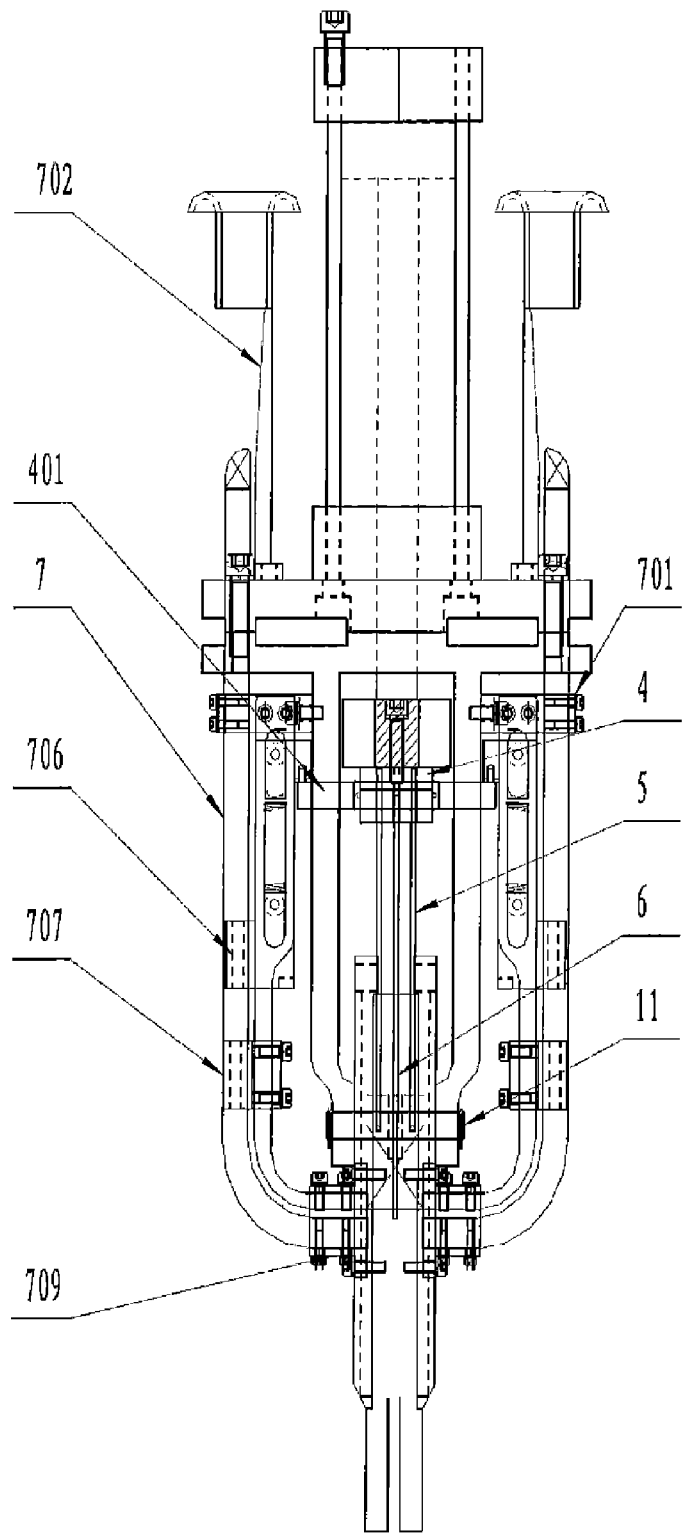
FIG. 2 is a lateral view of FIG. 1.
Figure 3:
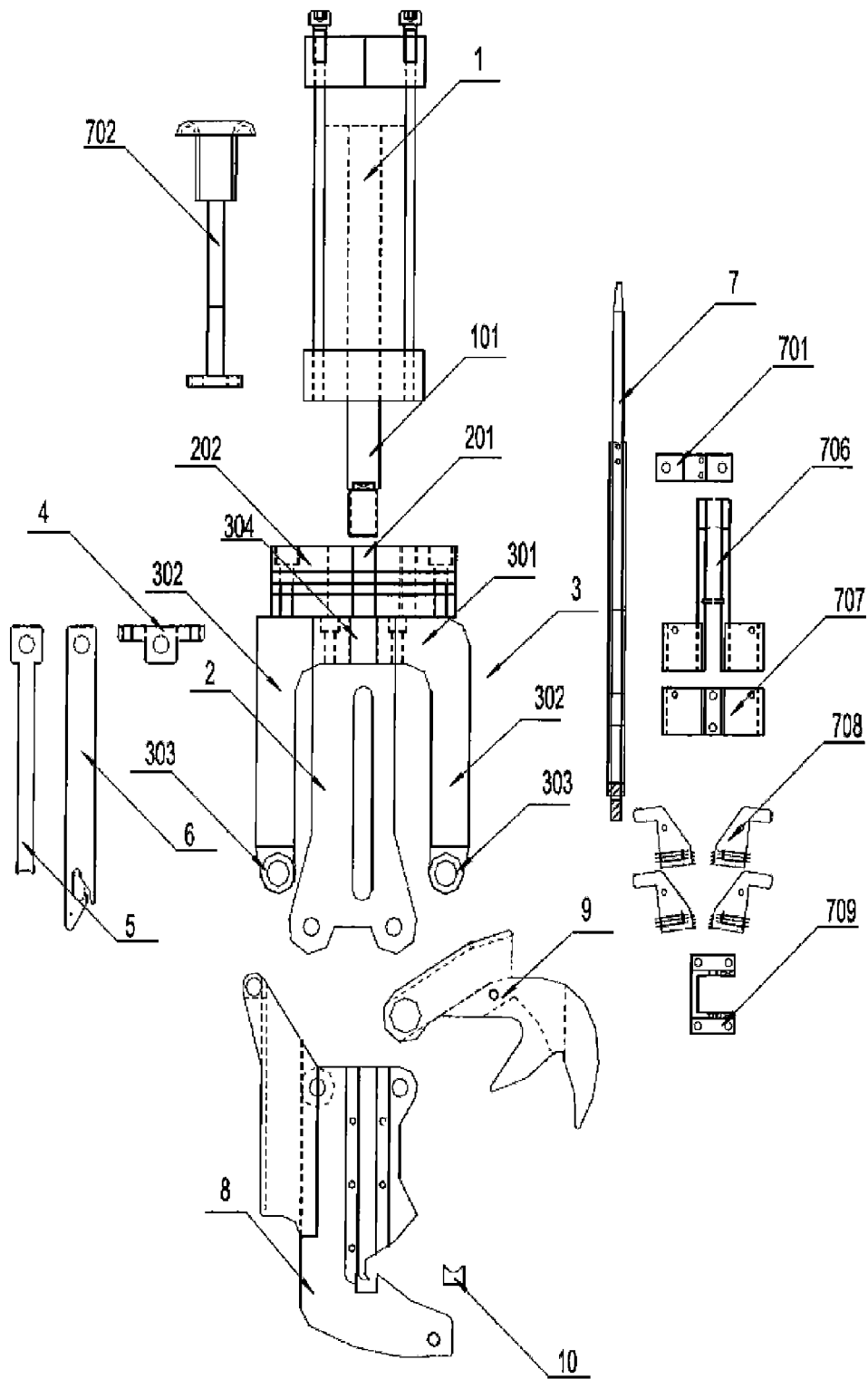
FIG. 3 is an exploded view of FIG. 1.
Figure 4:
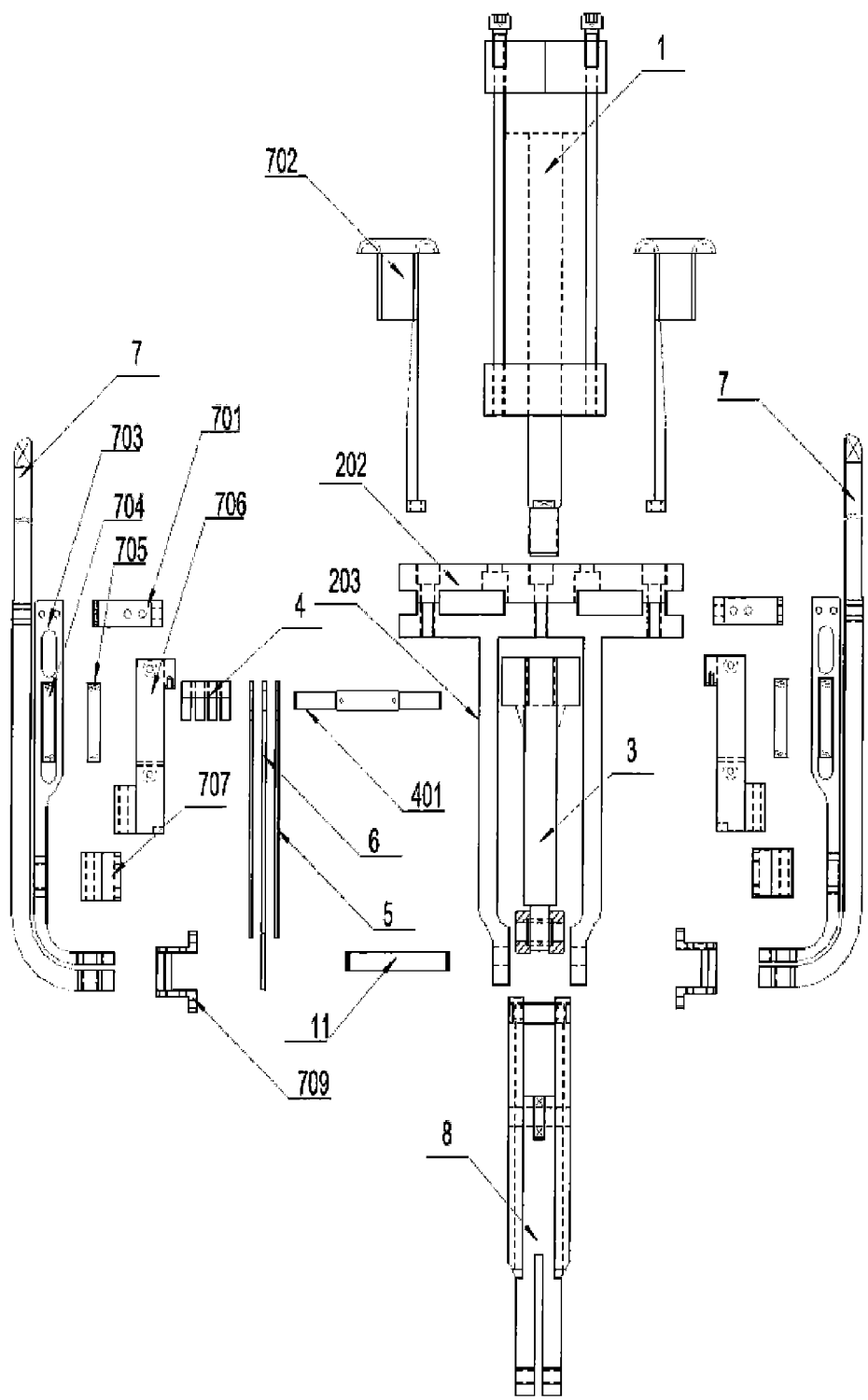
FIG. 4 is an exploded view of FIG. 2.

FIG. 1 is a general assembly view of the present invention, FIG. 2 is a lateral view of FIG. 1, FIG. 3 is an exploded view of FIG. 1 and FIG. 4 is an exploded view of FIG. 2; according to FIG. 1, 2, 3, 4, the single-cylinder single-claw double-card punching machine of the present invention comprises a linear cylinder 1, and the working end face of the linear cylinder 1 is connected to a connecting frame 2 through a screw connection; a central hole 201 (showed in FIG. 5c) allowing the piston rob 101 of the air cylinder 1 to pass through is provided in the central section of the connecting frame 2; after the piston rob 101 passes through the central hole 201, the end of the piston rob 101 is connected to an n-type gantry moving frame.

Figure 5A:
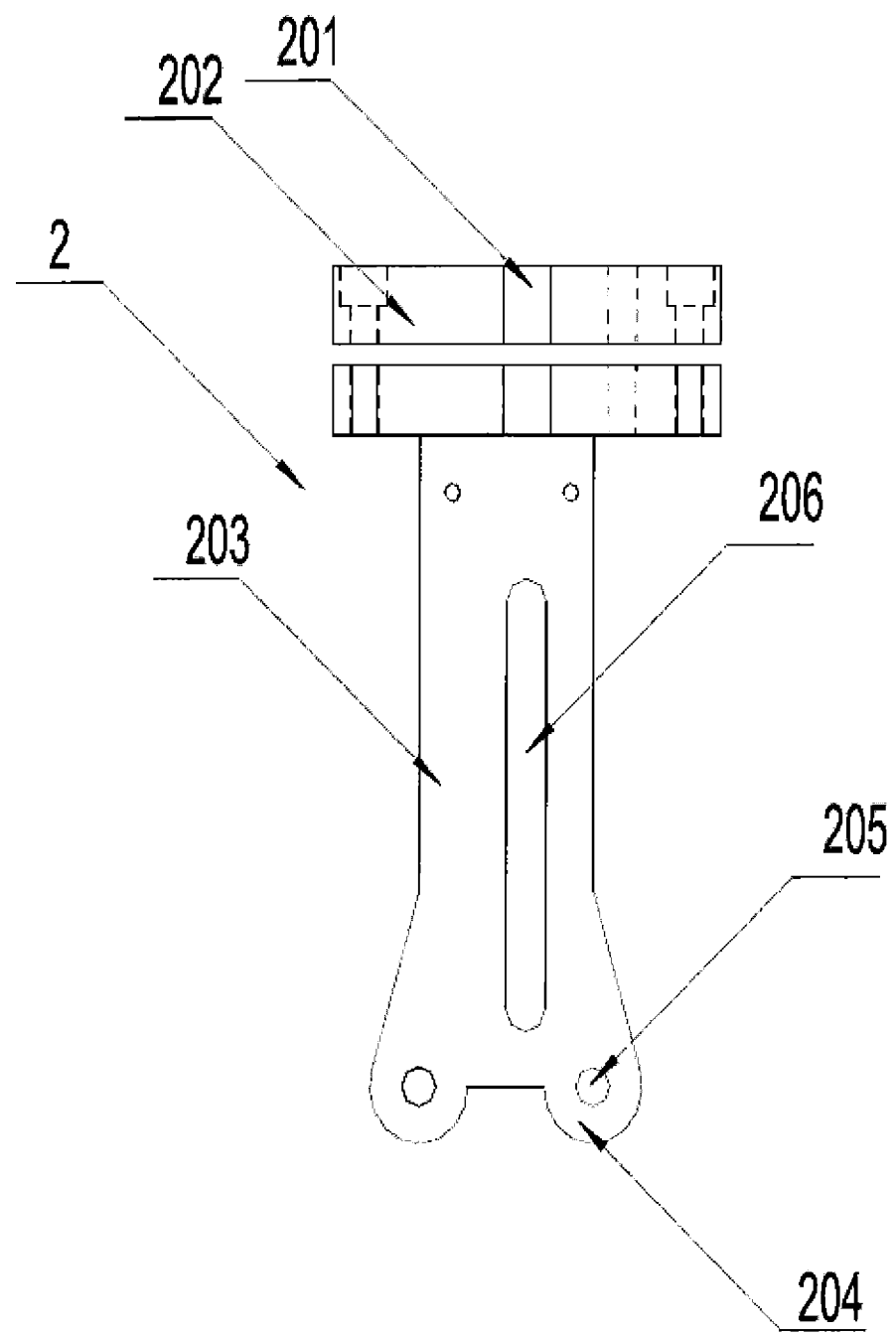
FIG. 5a, FIG. 5b and FIG. 5c are structure schematic views of the connecting frame of the present invention in FIG. 1.
Figure 5B:
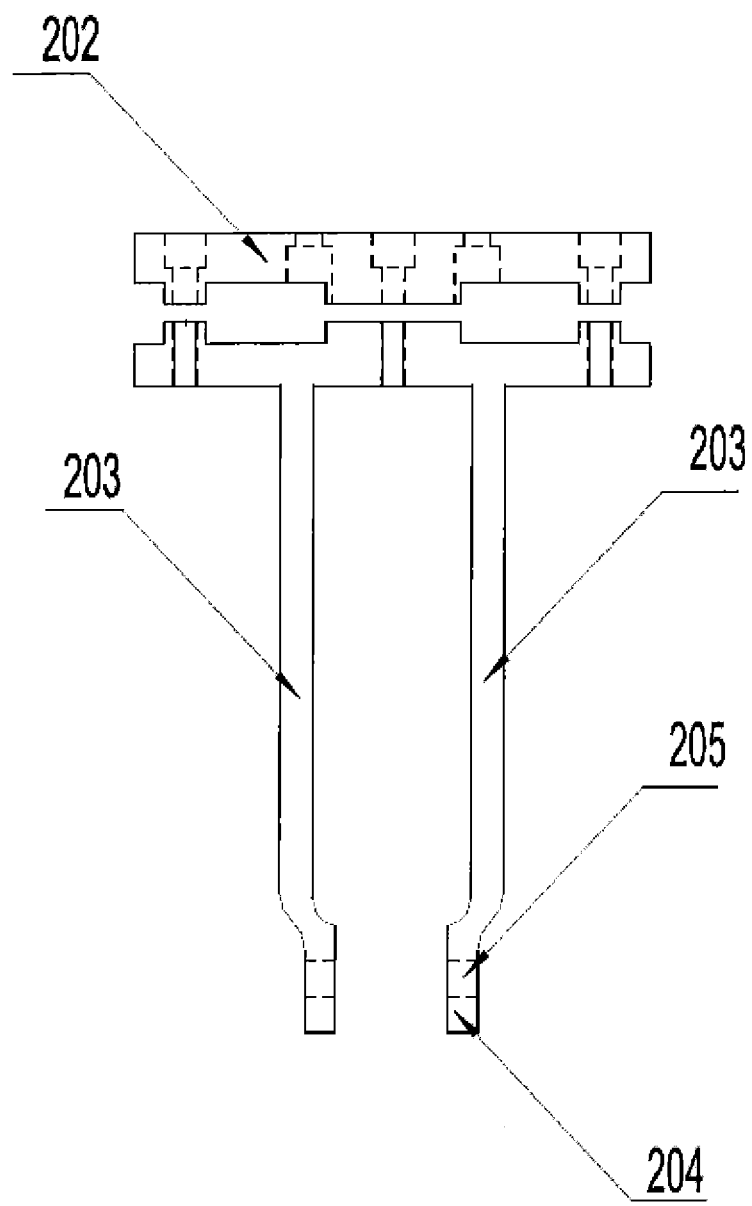
Figure 5C:
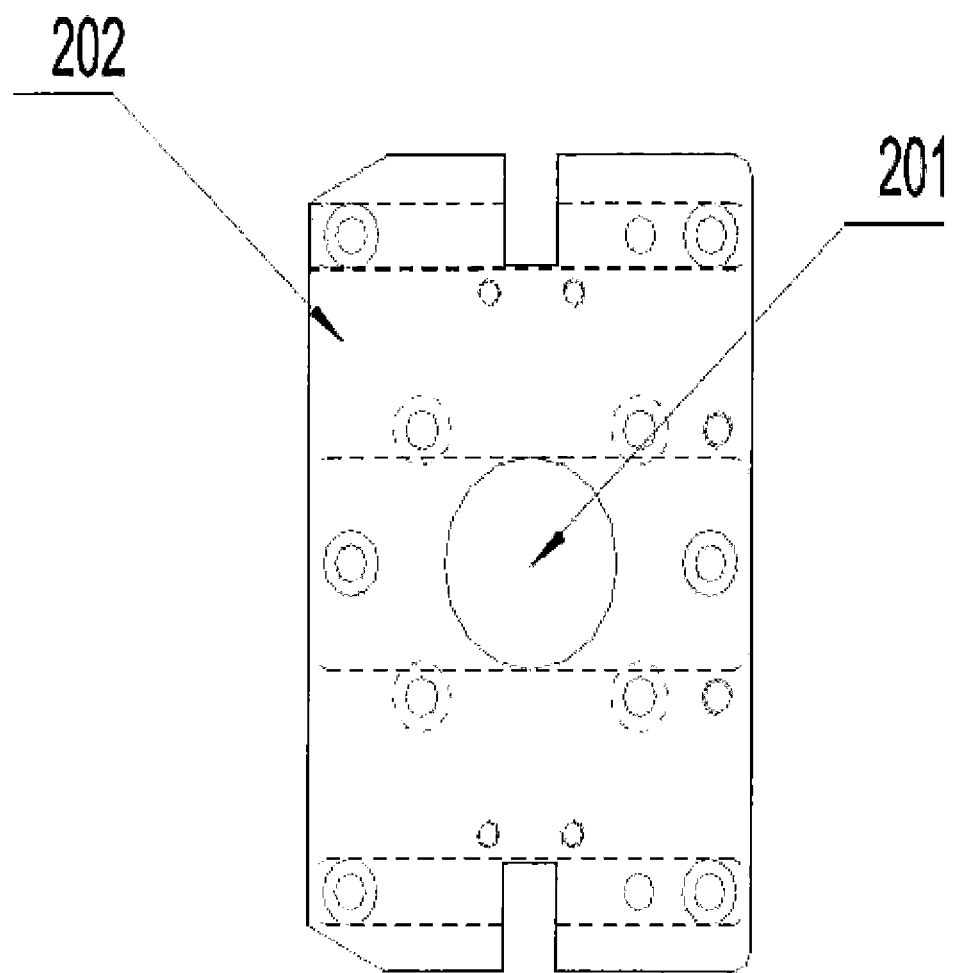
Figure 6:
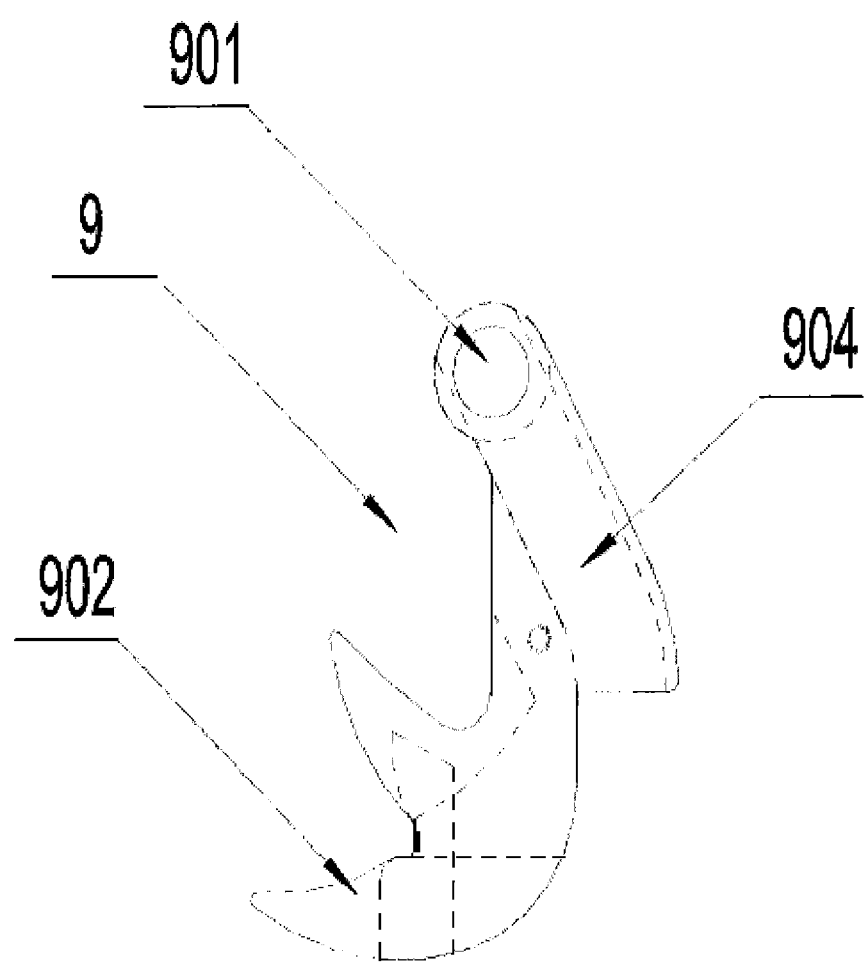
FIG. 6a and FIG. 6b are structure schematic views of the folding clamp of the present invention in FIG. 1.
Figure 6B:
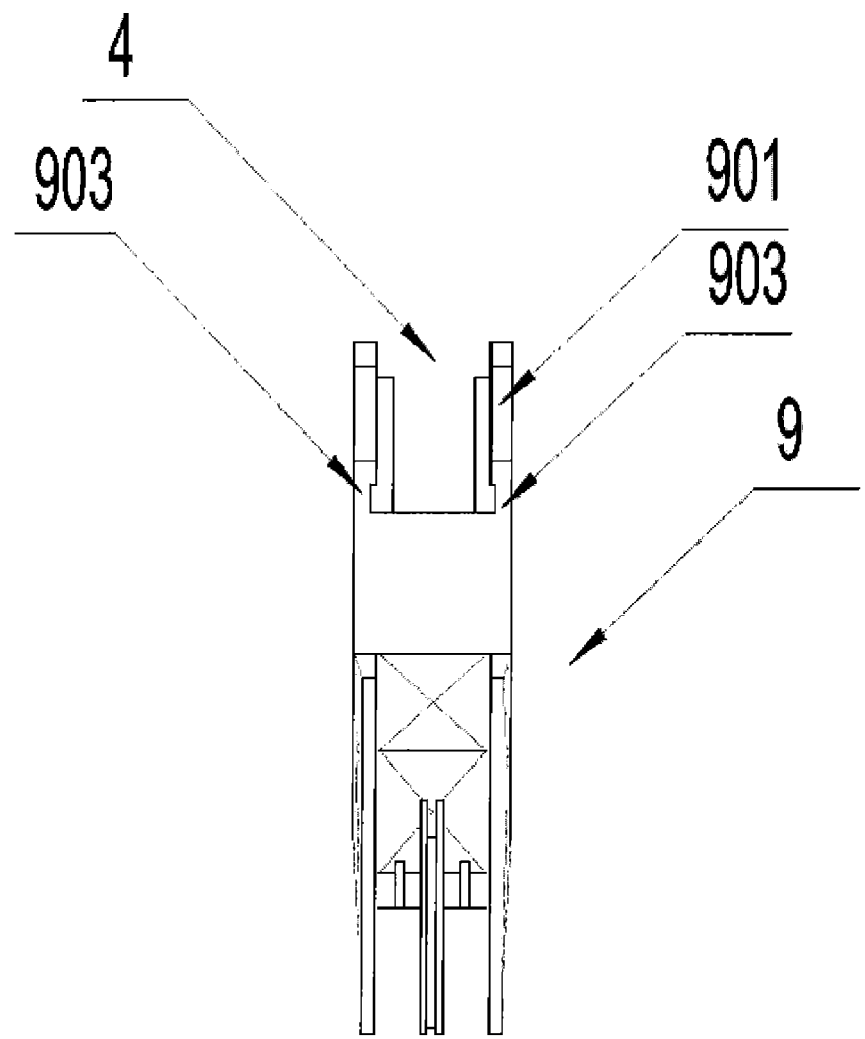
Figure 7A:
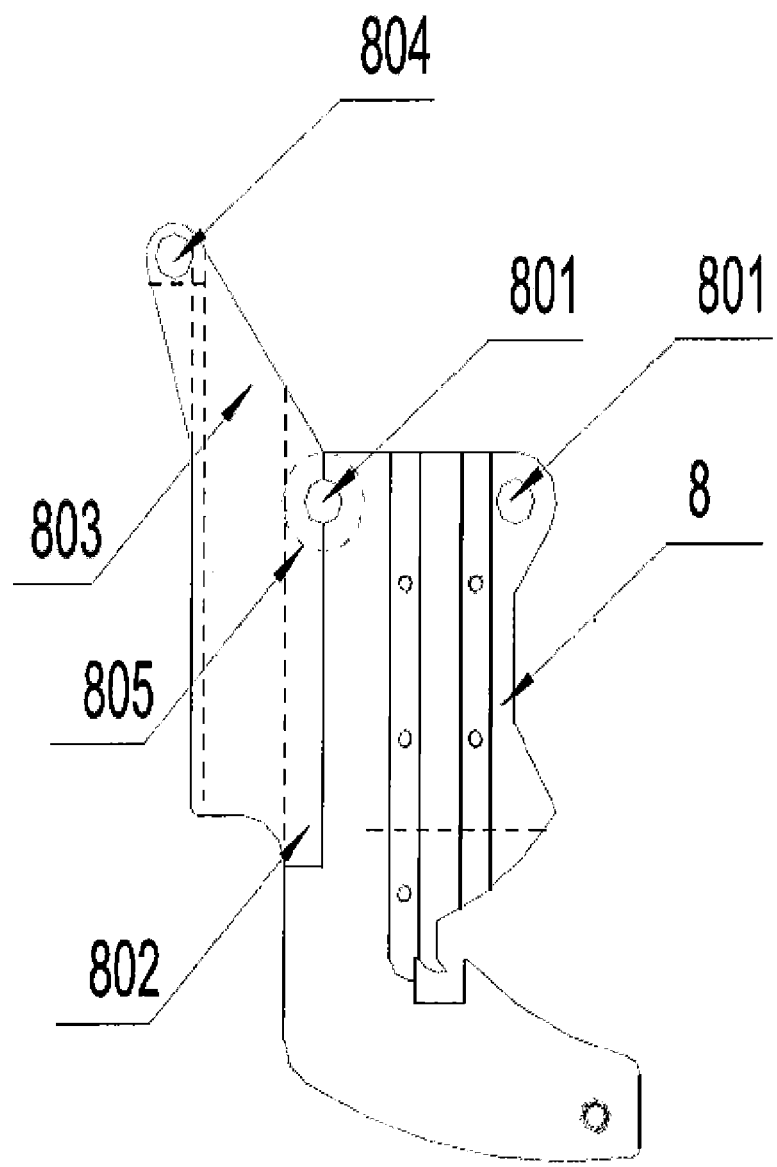
FIG. 7a and FIG. 7b are structure schematic views of the combined slideways of the present invention.
Figure 7B:
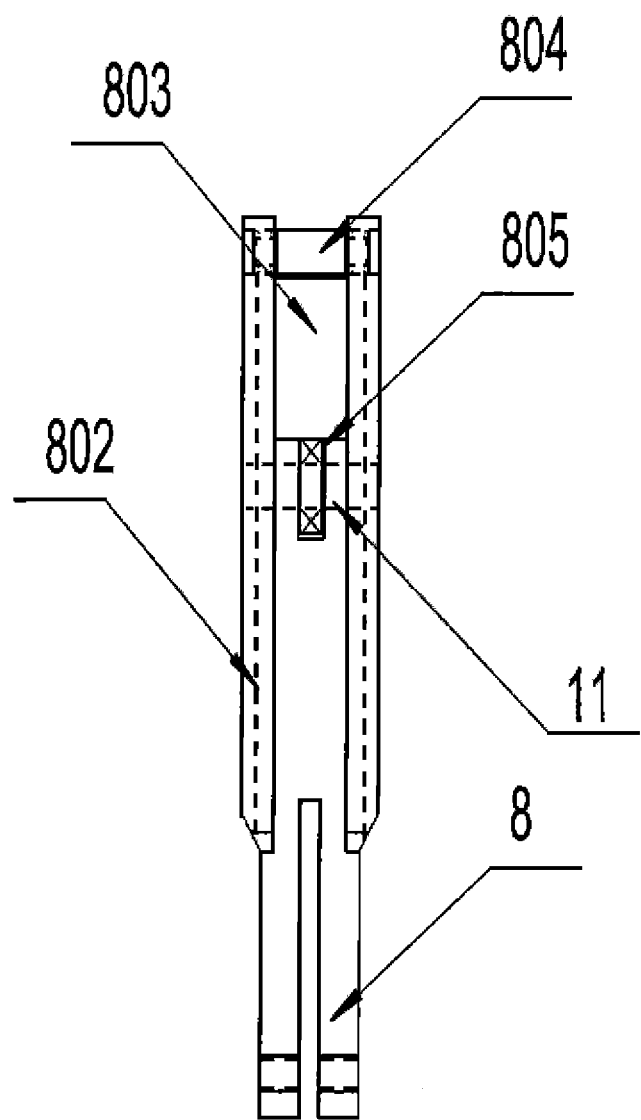

As shown in FIG. 5a, FIG. 5b and FIG. 5c, the connecting frame 2 comprises a basic plate 202 which is fixed at the working end of the cylinder by bolted connection (showed in FIG. 5c), each of both sides of lower surface of the basic plate 201 is provided with an integrated connecting plate 203; fixing legs with branches 204 are provided at the bottom of the connecting plate 203, making the whole connecting plate 203 in a shape of an inverted Y; fixing holes 205 are provided on the fixing legs 204; a central hole 201 allowing said piston rod 101 to go through is provided in the central section of the basic plate 202. Rail holes 206 are provided on the surfaces of the connecting plates 203 at both sides respectively.

The n-type gantry moving frame comprises a horizontal side 301 and two vertical sides 302 respectively at both sides, pulleys 303 are provided at the bottom of the two vertical sides 302 respectively, a through-hole 304 is provided on the horizontal side 301 to accommodate and fix the piston rob 101 of the cylinder.

The n-type gantry moving frame 3 is provided under the connecting frame 2, a fixed block 4 is fixed under the horizontal side 301 by a multi-purpose pin shaft 401, the both ends of the multi-purpose pin shaft 401 extend out of the Rail holes 206 in the connecting plate 203 of the connecting frame 2, and said ends are sealed with nuts.

Each of both sides of the fixed block 4 is provided with a card-pushing sheet 5, a hook-type cutter is fixed between card-pushing sheets 5 on both sides of fixing block 4; when using the punching machine, the n-type gantry moving frame moves down with the piston rob 101; because of the restriction of the multi-purpose pin shaft 401 and the rail slot hole 206, the n-type gantry moving frame keep moving in the vertical direction; the fixed block 4 may guarantee the card-pushing sheets 5 and the hook-type cutter 6 not be out of shape after repeated use.

The snap action moving device comprises a U-shape card-pushing guide rail 7 disposed under the connecting frame 2, the U-shape card-pushing guide rail 7 is formed by two L-shape guide rails whose lower sides are butted with each other, the lower sides of L-shape guide rails are disposed under the connecting frame 2. The n-type gantry moving frame is disposed in a square crossing manner with the U-shape card-pushing guide rail.

The vertical side of the L-shape guide rail is fixed on one side of the base plate 203 of the connecting frame 2, and fixed to the connecting plate 203 on the lower surface of the connecting frame 2 by the rail supporting frame 701, snap action guidance device 702 is assembled at the end part of the vertical side of the L-shape guide rail, a mounting plate 703 is provided at the inner side of the L-shape guide rail, the rail supporting frame 701 is fixed at the top of the mounting plate 703, a strip hole 704 is disposed on the central section of the mounting plate 703, a spring 705 is provided at the upper part in the strip hole 704, a card-pushing device 706 is assembled on the strip hole 704 of the mounting plate 703 through a pin shaft and a bearing, and the card-punching device 706 keeps compressing the spring 705 by the multi-purpose pin shaft 401 to complete the card-pushing mission.

A card-pushing retaining device 707 is provided under the card-pushing device 706, and the card-punching retaining device 707 is assembled on the card-pushing guide rail 7 and the mounting plate 703, snap retaining block 708 may be assembled on the card-pushing retaining device and also may be assembled at the bottom of the card-punching device side by side at the same time.

The end of the horizontal side of the L-shape guide rail is fixed to the mounting plate 703 and folding clamp 9 or retaining clamp 8 through guide rail fixed block 709.

As shown in FIG. 6a, FIG. 6b, FIG. 7a and FIG. 7b, the folding clamp of the present invention comprises a retaining clamp 8 and a folding clamp 9 coordinated with each other in an embedded manner, the retaining clamp 8 is claw type, two pin shaft holes 801 are provided on the both top ends of the retaining clamp 8, the pin shaft holes 801 are aligned with the fixing holes 205 in the fixing leg 204 on the lower end of the inverted Y-type connecting frame 203, and fixed by the pin shaft 11; a guide block 802 is provided on one side of the retaining clamp 8, the guide block 802 and the retaining clamp 8 are disposed in a interleaved embedded manner, allowing the guide block 802 to be against the retaining clamp 8 and to reinforce the remaining clamp 8, so as to resist the effect of the impact force from the folding clamp 9. A snap molding 10 is embedded in the corner of the hook-type retaining clamp 8.

Chute 803 is disposed in the guide block 802, said chute 803 accommodates the foot pulley 303 on the vertical side 302 of the n-type gantry moving frame 3, guide roller 804 is provided on one side of the chute 803, and guide bearing 805 is provided on the other side of the chute 803, the guide bearing 805 is hitched to the pin shaft 11 on the fixing leg 204. The guide bearing 805 cooperates with the guide roller 804 to guide the vertical side 302 of the n-type gantry moving frame 3 to smoothly move up and down in the chute 803.

In order to guarantee the performances of the card-pushing sheet 5 and hook-type cutter 6, in the present invention, a cutter guide slot is further designed in the middle of the retaining clamping 8 to accommodate and guide the hook-type cutter 6, guide slots are respectively provided at both sides of the cutter guide slot to accommodate and guide the card-pushing sheet 5. the above-mentioned two guide slots are not shown in the figures.

The folding clamp 9 comprises a crab claw 902, both sides of the back of the crab claw 902 reversely extend to form two lateral plates 903, pin shaft holes 901 are provided at the end of the two lateral plates 903, said pin shaft holes 901 are aligned with the fixing hole 205 in the other said of the fixing leg 204 and then fixed by the pin shaft 11; the space between the two lateral plates 903 forms a slideway 904, which accommodates the other foot pulley 303 on the vertical side of the n-type gantry moving frame 3.

Figure 8:
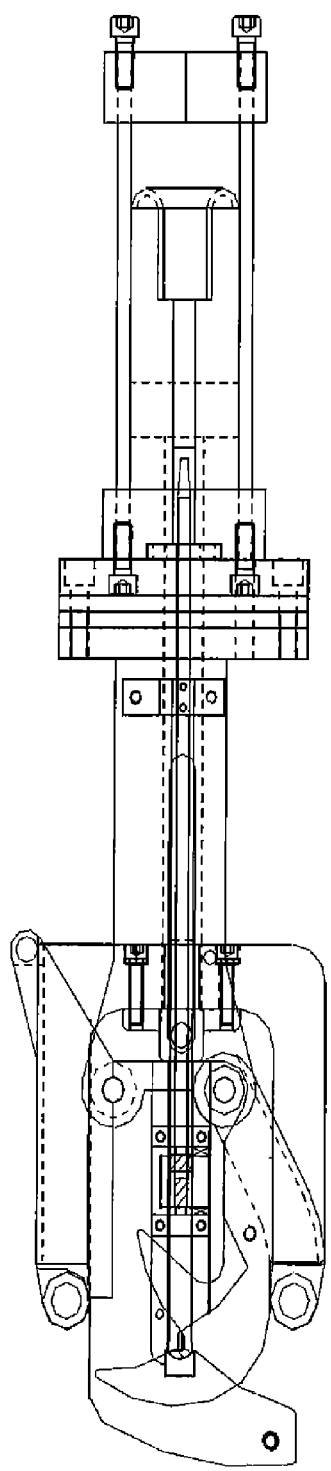
FIG. 8 is a structure schematic view of the present invention in FIG. 1, in a stowed state.

As shown in FIG. 8, the working process of the present invention is that: the air cylinder 101 pushes the n-type gantry moving frame 3 to move downward, and meanwhile, drives the card-pushing sheet 5, the hook-type cutter 6, the folding clamp 9 and card-pushing device 706 under the action of the spring 705 to act together, so that the card-pushing device 706 pushes cards to both sides of the remaining clamp 8, the folding clamp 9 tucks the casing, and the card-pushing sheet 5 pushes the card until the snap action is completed. When the air cylinder moves upward, the action moves conversely; the hook-type cutter 6 cuts down the casing, folding clamp 6 is released and charge pipe is discharged until the multi-purpose pin shaft 401 compresses the card-pushing device 706. The air cylinder 1 reciprocates once to complete a card-punching cycle.

According to above statement, embodiments of the present invention have been described in detail, but it is obviously to the skilled person in the art that, various modifications could be derived without departing from the spirits and the effects of the invention. Therefore, the modifications or alternations derived thereof are still included in the protection scope of the present invention.

The invention claimed is:

1. A single-cylinder single-claw double-card punching machine configured to punch a card in a punching cycle, the single-cylinder single-claw double-card punching machine comprising:
    a card-pushing sheet;
    a cutter;
    a snap action moving device;
    a retaining clamp;
    a folding clamp;
    a gantry moving frame; and
    a single air cylinder adapted to:
        push the gantry moving frame to move in a downward direction while: (i) driving the snap action moving device, the card-pushing sheet and the cutter to move in the downward direction, and (ii) driving the retaining clamp and the folding clamp to tuck a casing until a snap action is completed; and
        drive the gantry moving frame to move in an upward direction while; (iii) driving the card-pushing sheet and the cutter to move the an upward direction to cut the casing, and (iv) releasing the folding clamp, thereby completing a punching cycle.

2. The single-cylinder single-claw double-card punching machine according to claim 1, wherein
    a connecting frame is connected to a working end face of the air cylinder, and connecting plates are provided at both sides of the connecting frame,
    a n-type gantry moving frame is disposed in the middle under the connecting frame in an interleaved manner,
    a piston rod of the air cylinder passes through the connecting frame to connect with the n-type gantry moving frame, and
    a retaining clamp and a folding clamp are provided at a bottom of the connecting frame.

3. The single-cylinder single-claw double-card punching machine according to claim 2, wherein
    a card-pushing sheet and a cutter are disposed under the n-type gantry moving frame, and
    pulleys are provided at both sides of a bottom of the n-type gantry moving frame, the pulleys respectively sliding in slideways of the retaining clamp and the folding clamp.

4. The single-cylinder single-claw double-card punching machine according to claim 2, wherein
    both sides of the connecting frame are provided with a snap action moving device, and the snap action moving device is provided in a square crossing manner with the n-type gantry moving frame.

5. The single-cylinder single-claw double-card punching machine according to claim 2, wherein
    the connecting frame comprises a basic plate, which is fixed at the working end of the cylinder by bolted connection, each of both sides at a lower surface of the basic plate is provided with an integrated connecting plate, the integrated connecting plate is in an inverted Y shape and provided with fixing legs with branches at a bottom of the connecting plate,
    fixing holes are provided on the fixing legs,
    a central hole for the piston rod to go through is disposed in a central section of the basic plate, and
    rail holes are provided on surfaces of connecting plates at both sides.

6. The single-cylinder single-claw double-card punching machine according to claim 5, wherein
    a multi-purpose pin shaft is provided between the rail holes on the connecting plates at both sides, the multi-purpose pin shaft is adapted to move up and down in the rail holes, and the multi-purpose pin shaft is located under the n-type gantry moving frame, and a fixed block is provided on the multi-purpose pin shaft, the card-pushing sheet and the cutter are assembled on the fixed block.

7. The single-cylinder single-claw double-card punching machine according to claim 6, wherein
the cutter is hook-type or cut-type.

8. The single-cylinder single-claw double-card punching machine according to claim 2, wherein
the retaining clamp and the folding clamp are coordinated with each other in an embedded manner, and the retaining clamp is claw type,
two pin shaft holes are provided on two top ends of the retaining clamp, the pin shaft holes are aligned with fixing holes in the connecting frame and fixed by pin shafts;
a guide block is provided on one side of the retaining clamp, a chute is provided in the guide block, the chute accommodates a foot pulley on the vertical side of the n-type gantry moving frame, and
a snap molding is embedded in a corner of the retaining clamp.

9. The single-cylinder single-claw double-card punching machine according to claim 8, wherein
the guide block and the retaining clamp are disposed in an interleaved embedded manner, the guide block is against the retaining clamp.

10. The single-cylinder single-claw double-card punching machine according to claim 8, wherein
a guide roller is provided on one side of the chute, and
a guide bearing is provided on the other side of the chute, the guide bearing is hitched to a pin shaft disposed on a fixing leg, and coordinates with the guide roller to guide the vertical side of the n-type gantry moving frame to move up and down in the chute.

11. The single-cylinder single-claw double-card punching machine according to claim 8, wherein
a cutter guide slot is provided in the middle of the retaining clamp for accommodating and guiding a hook-type cutter, and
guide slots are respectively provided at both sides for accommodating and guiding card-pushing sheets.

12. The single-cylinder single-claw double-card punching machine according to claim 2, wherein
the folding clamp comprises a crab claw, both back sides of the crab claw reversely extend to form two lateral plates,
pin shaft holes are provided at ends of the lateral plates, the pin shaft holes are aligned with fixing holes in the connecting frame of the other side and fixed by pin shafts, and
the space between two lateral plates forms a slideway, the slideway accommodates another foot pulley on the n-type gantry moving frame.

13. The single-cylinder single-claw double-card punching machine according to claim 2, wherein
the snap action moving device comprises a U-shape guide rail which is formed by two L-shape guide rails respectively located on left and right sides whose lower sides are butted with each other, a vertical side of the L-shape guide rail is fixed on one side of a basic plate of the connecting frame, and also fixed on the connecting plate which is on a lower surface of the connecting frame through a rail supporting frame,
a snap guide device is provided on one end of the vertical side of the L-shape guide rail,
a mounting plate is provided on an inner side of the L-shape guide rail, the rail supporting frame is fixed on top of the mounting plate,
a strip hole is provided in a central section of the mounting plate,
a spring is provided in an upper inner part of the strip hole,
a card-punching device is assembled on the strip hole of the mounting plate through a pin shaft and a bearing, and the card-punching device keeps compressing the spring by a multi-purpose pin to deliver snap units, and
an end of a horizontal side of the L-shape guide rail is fixed to the retaining clamp or folding clamp together by a guide rail fixed block and the mounting plate.

14. The single-cylinder single-claw double-card punching machine according to claim 13, wherein
a card-punching retaining device is provided under the card-punching device, and the card-punching retaining device is assembled at the card-punching guide rail and the mounting plate, and
the bottom of the card-punching retaining device or the card-punching device is provided with a snap retaining block.

* * * * *